(12) United States Patent
Zhou

(10) Patent No.: US 12,376,564 B1
(45) Date of Patent: Aug. 5, 2025

(54) PET BATH MACHINE

(71) Applicant: Jie Zhou, Chino Hills, CA (US)

(72) Inventor: Jie Zhou, Chino Hills, CA (US)

( * ) Notice: Subject to any disclaimer, the term of this patent is extended or adjusted under 35 U.S.C. 154(b) by 0 days.

(21) Appl. No.: 18/746,665

(22) Filed: Jun. 18, 2024

(51) Int. Cl.
*A01K 13/00* (2006.01)

(52) U.S. Cl.
CPC ................... *A01K 13/001* (2013.01)

(58) Field of Classification Search
CPC .................................................. A01K 13/001
See application file for complete search history.

(56) References Cited

U.S. PATENT DOCUMENTS

| | | | |
|---|---|---|---|
| 4,549,502 A * | 10/1985 | Namdari | A01K 13/001 119/664 |
| 5,724,918 A * | 3/1998 | Navalon-Chicote | A01K 13/001 119/668 |
| 7,011,044 B2 * | 3/2006 | Segura Jobal | A01K 13/001 119/669 |
| 7,100,538 B2 * | 9/2006 | Motomura | A01K 13/001 119/668 |
| 8,485,136 B2 * | 7/2013 | Caldwell | A01K 13/001 119/675 |
| 9,420,760 B2 * | 8/2016 | Caldwell | A01K 13/001 |
| 2024/0334903 A1 * | 10/2024 | Armer | E04H 1/1205 |

* cited by examiner

*Primary Examiner* — Ebony E Evans
(74) *Attorney, Agent, or Firm* — Clement Cheng

(57) ABSTRACT

A pet bath machine has a utility cabinet with a hot water line and a cold water line. The hot water line and the cold water line connect together at a water inlet line. A pump system includes a pump controller that controls a flow of water. The flow of water includes a flow of hot water and a flow of cold water. The pump controller can be a 12 VDC controller. A shampoo pump controls a flow of shampoo to the flow of water. A washing station has a washing chamber with a spray system mounted over the washing chamber. The spray system includes nozzle panels mounted in a nozzle panel frame. The nozzle panels have multiple individual nozzle heads. The spray system is connected to the water inlet line. The display is connected to a payment processor.

18 Claims, 9 Drawing Sheets

PET BATH MACHINE

TECHNICAL FIELD

The present disclosure relates to a pet bath machine.

BACKGROUND

A variety of different portable pet washing stations/pet washing stations have been discussed in United States patents and mostly relating to dog washing. For example, in U.S. Pat. No. 4,083,328 entitled "Portable Pet Washing Device" by Sandra Baker, published Apr. 11, 1978, the inventor describes "A rigid tub has an outlet hose affixed to the bottom thereof extending from an outlet hole for draining the tub. An outlet cap on the outlet hose manually controls the flow of fluid through the hose. A flexible bag has a body opening and a head opening formed therethrough and a zipper extending along the body opening to the head opening for selectively opening and closing the body opening to position a pet therein with its head extending beyond the bag through the head opening. A first fastening device releasably affixes the bag to the tub in a manner whereby the bag covers the tub and extends a distance thereabove. An inlet in the bag admits solids and fluids into the bag onto a pet in the tub. A pair of spaced hand holes are formed through the bag. Each of a pair of sleeves extends from the bag at a corresponding one of the hand holes for accommodating the arms of a user washing a pet in the tub."

For example, in U.S. Pat. No. 3,884,191 entitled "Animal Bathing and Drying Apparatus" by Pansy M. Stout, published May 20, 1975, the inventor describes "An animal bathing and drying apparatus for dogs and the like including a container wherein there is provided a means for spraying water and/or cleaning solution onto the animal being bathed, and wherein there is also provided a bottom wall adapted to be inclined by the weight of an animal thereon for draining the water. Drying air is forced through the same pipes used for the water spray after the water is shut off. There is further provided an adjustable member for engaging the neck of the animal to restrain the animal during bathing and drying."

For example, in United States publication 2017/0094939 entitled "Animal Bathing Assembly" by Cassandra Wright, published Apr. 6, 2017, the inventors describe "An animal bathing assembly includes a housing that may have an animal placed therein. A washing unit is coupled to the housing. The washing unit dispenses a fluid onto the animal when the animal is positioned within the housing. A plurality of scrubbing units is provided an each of the scrubbing units is coupled to the housing. Each of the scrubbing unit scrubs the animal when the animal is positioned within the housing. A drying unit is coupled to the housing. The drying unit urges air onto the animal thereby facilitating the animal to be dried. A control is coupled to the housing and the control may be manipulated. The control is electrically coupled to the washing unit, the scrubbing unit and the drying unit. The control controls operational parameters of the washing unit, the scrubbing unit and the drying unit."

For example, in U.S. Pat. No. 7,497,188 entitled "Pet Bathing Apparatus" by Weol Yeam Cho, published Mar. 3, 2009, the inventor describes "Pet bathing apparatus includes an inner casing defining a space for accommodating a pet and having a transparent door for entrance and exit of the pet, an outer casing provided outside the inner casing and spaced apart from the inner casing, and a base part including a support plate having openings and a net arranged on the support plate. A spray nozzle unit distributes water into the space and includes a plurality of fixed and rotary nozzles. A water supply unit includes a main tube coupled with a plurality of branch tubes, which are coupled with the spray nozzle unit, a water feeding pipe defining a water supply path to the main tube, and a container for supplying shampoo to the water feeding pipe. A drain unit collects and removes water, and a blowing unit provides air to the inner casing."

For example, in United States publication 2003/0196608 entitled "Pet Dog Washing Apparatus and Method for Controlling the Same" by Myung Chul Lee, published Oct. 23, 2003, the inventor describes, "Provided are a batch-style or selective-style pet dog washing apparatus implemented by automatic control of a sensor and a driver, and a method for controlling the same. The apparatus includes a supporting base for placing a pet dog to be washed thereon and supporting the pet dog, a washer installed in the vicinity of the pet dog, for washing the pet dog by rubbing the same, a component controller for sensing the positions of the pet dog and the washer, adjusting the height of the supporting base according to the size of the pet dog, varying the position of the washer to get close to the pet dog, and actuating the washer, and a cleaning liquid/air supplier for supplying a cleaning liquid and air to the washer."

For example, in United States publication 2007/0289548, entitled "Portable Pet Shower and Drye Apparatus" by Jerry Wayne Smoot, published Dec. 20, 2007, the inventor describes "Provided are a batch-style or selective-style pet dog washing apparatus implemented by automatic control of a sensor and a driver, and a method for controlling the same. The apparatus includes a supporting base for placing a pet dog to be washed thereon and supporting the pet dog, a washer installed in the vicinity of the pet dog, for washing the pet dog by rubbing the same, a component controller for sensing the positions of the pet dog and the washer, adjusting the height of the supporting base according to the size of the pet dog, varying the position of the washer to get close to the pet dog, and actuating the washer, and a cleaning liquid/air supplier for supplying a cleaning liquid and air to the washer."

For example, in U.S. Pat. No. 4,087,032, entitled "Animal Bathing Apparatus" by James Christ Dimitriadis, published Nov. 8, 1977, the inventor describes "A dog bath apparatus comprising an adjustable frame structure adapted to support a housing cover which forms a somewhat sealed compartment in which various animals, particularly dogs, are positioned to be washed therein, having the head of the animal protruding through an aperture of the forward wall thereof. The frame structure includes a water-spray discharge pipe wherein the frame and the housing cover are received in a bottom drain pan having a discharge port to allow the water therein to be drained while the animal is being washed. Additional access slots are provided through which one can readily reach the animal during the washing operation."

For example, in United States publication 2006/0102097 entitled "Portable Washing Apparatus for Animals" by Roger W. Price, published May 18, 2006, the inventor describes "The portable washing apparatus for animals has a base and an opposite lid that combine to form a container. The base has a floor and walls to store and to release water, and straps to secure temporarily a pet such as a dog. The lid fits upon the base and over a pet therein. The apparatus includes at least one pair of gloves that have a watertight connection to openings in the base and the lid. A sprayer system connected to the base allows an owner to direct water upon all parts of a pet. The lid and base contain wash water from a pet so the owner avoids a soaking and the pet can be washed indoors or outdoors."

For example, in U.S. Pat. No. 4,930,453, entitled "Small Animal Washing Device" by David R. Laliberte, published Jun. 5, 1990, the inventor describes "A device for washing small animals includes a base having a floor sloping toward a drain. A screen covers the drain for trapping loose animal hair and a grate overlies the floor for supporting an animal to be washed. A dome formed from a transparent material is removably retained by a plurality of latches on the base for confining an animal. An opening formed in one end of the dome is dimensioned to receive a small animal's head through a slit in a rubber sheet covering the opening. A plurality of circular apertures are provided in the dome to receive a pair of glove inserts in various locations for conveniently washing an animal within the dome. A plurality of cover plates are provided for closing the circular apertures not currently in use. Each of the circular apertures includes a radially extending lip and an adjacent undercut groove for engagement with a resilient sealing disc of the glove inserts or the cover plates. In a second embodiment, the base and dome may be formed from two telescoping sections for adjusting the device for various different sizes of animals. The small animal washing device may be utilized as a carrying case for transporting animals."

For example, in U.S. Pat. No. 5,662,069 entitled "Animal Bathing Apparatus" by Leonard Smith, published Sep. 2, 1997, the inventor describes "An animal bathing unit including a rigid base portion and a panel assembly. The rigid base portion has an upwardly projecting peripheral wall extending completely thereabout to define a relative shallow tub for supporting an animal. The panel assembly is operably associated with the peripheral wall of the base portion. The panel assembly is movable between an upwardly projecting extended position to define an open sided enclosure within which the animal can be contained for bathing, and a collapsed storage position to facilitate storage and transportation of the unit. The above publications are incorporated herein by reference."

SUMMARY OF THE INVENTION

A pet bath machine has a utility cabinet with a hot water line and a cold water line. The hot water line and the cold water line connect together at a water inlet line. A pump system includes a pump controller that controls a flow of water. The pump system may include pumps that have valves or valves that have pumps. The shampoo pump can be made as a shampoo valve that admits shampoo when activated. The flow of water includes a flow of hot water and a flow of cold water. The pump controller can be a 12 VDC controller. A shampoo pump controls a flow of shampoo to the flow of water. A washing station has a washing chamber with a spray system mounted over the washing chamber. The spray system includes nozzle panels mounted in a nozzle panel frame. The nozzle panels have multiple individual nozzle heads. The spray system is connected to the water inlet line. The display is connected to a payment processor.

Optionally, a plurality of nozzle trays are formed on the nozzle panel frame. The plurality of nozzle trays receives the nozzle panels. A water outlet branch connects to the nozzle panels. The nozzle panels include a first nozzle panel, a second nozzle panel, a third nozzle panel, and a fourth nozzle panel. The water inlet line branches at the water outlet branch to water lines. The first nozzle panel is connected to a first water line, a second nozzle panel is connected to a second water line, a third nozzle panel is connected to a third water line, and a fourth nozzle panel is connected to a fourth water line.

A wireless transceiver is connected to the payment processor, and the payment processor electronically processes payments. The blower wand is for blow drying and a rinse wand is for rinsing. Both the blower wand and rinse wand are mounted in the washing chamber. The shampoo container and disinfectant container can be refilled when low. The pump controller controls a shampoo pump and a disinfectant pump. Pumps can be used as valves. Pumps include gate pumps and valves. The shampoo pump admits shampoo from the shampoo container to the inlet water line. The disinfectant pump admits disinfectant from the disinfectant container to the inlet water line. The nozzle rack receives the nozzle panel frame and allows modular interchangeability of the nozzle panel frame. The nozzle rack is mounted above the washing chamber.

The following call out list of elements can be a useful guide in referencing the element numbers of the drawings.

10 Utilities Cabinet
11 Upper Side Hatch
12 Lower Side Hatch
13 Front Hatch
14 Payment Processor
15 Display
16 Feet
17 Latch
18 Touch Screen
19 Transceiver
20 Washing Station
21 Front Cover
22 Front Door
23 Washing Chamber
24 Front Cover Handle
25 Front Cover Rail
26 Front Cover Hinge
27 Front Cover Overlap
28 Front Door Rail
29 Front Door Handle
Spray System
31 Rainfall Nozzle Assembly
32 Nozzle Rack
33 Nozzle Panel
34 Blower Wand
35 Rinse Wand
36 Nozzle Panel Frame
37 Inlet Water Line
38 Shampoo Line
39 Shampoo Mixer
40 Step
41 Step Rail
42 Step Pocket 50 Hot Water Tank
51 Pump Controller
52 Pump system
53 Shampoo Pump
54 Disinfectant Pump
55 Shampoo Bin
56 Disinfectant Bin
57 Power Supply
58 Cold Water Line
59 Hot Waterline
60 Nozzle Array
61 First Nozzle Panel
62 Second Nozzle Panel
63 Third Nozzle Panel
64 Fourth Nozzle Panel
65 First Water Line
66 Second Water Line
67 Third Water Line
68 Fourth Water Line
69 Water Outlet Brand
71 Main Shutoff Pump
72 Subfloor
73 Drain Pan
74 Blower Motor
76 Panel Frame Periphery
77 Building Water Connection
78 Panel Frame Upper
81 First Nozzle Tray
82 Second Nozzle Tray
83 Third Nozzle Tray
84 Fourth Nozzle Tray
88 Pipe Elbow
89 Pipe Quick Connection
90 Nozzle Head
91 Air Pump

DETAILED DESCRIPTION OF THE EMBODIMENTS

Figure 1:
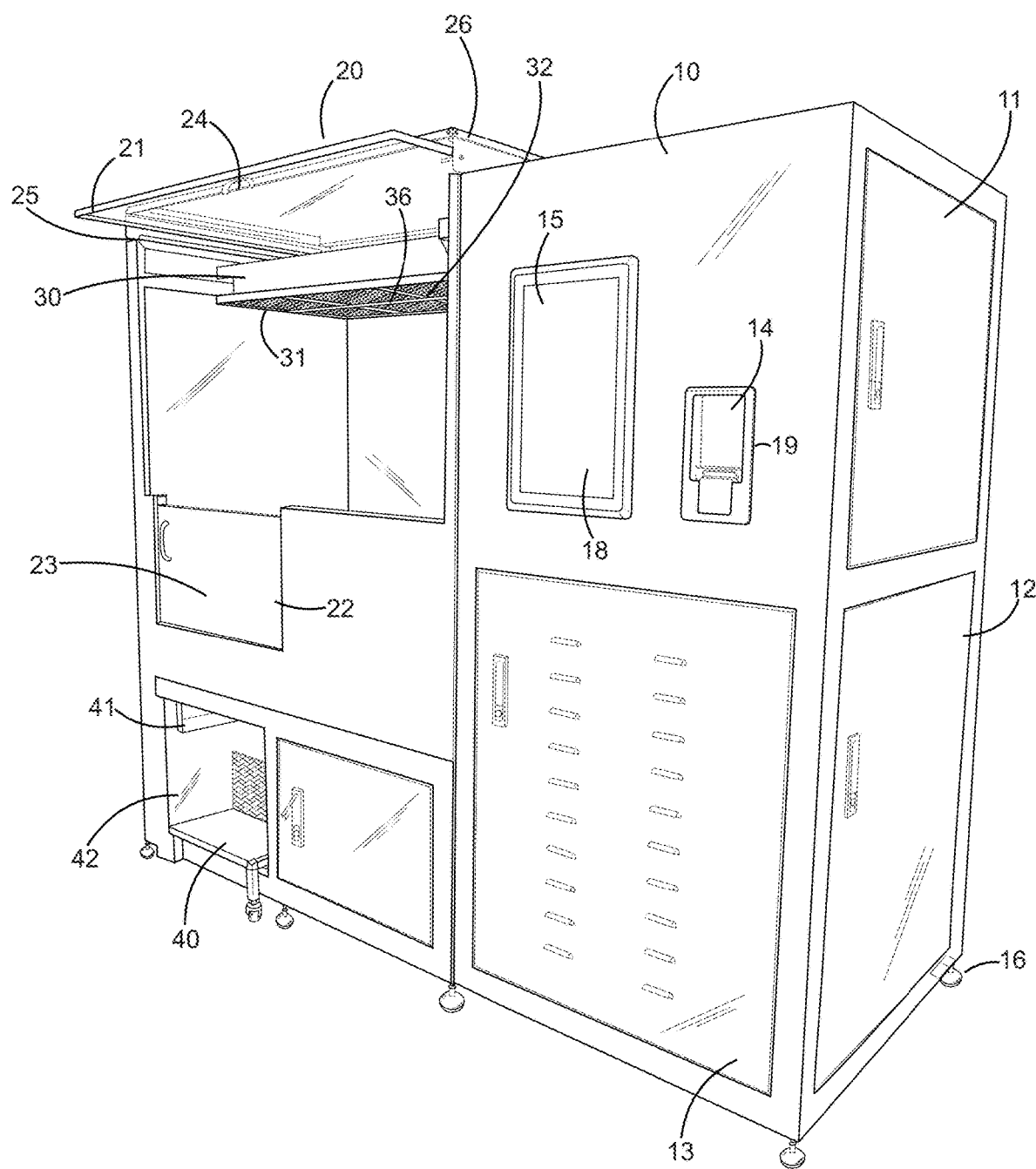
FIG. 1 is a perspective view of the present invention.

As seen in FIG. 1, the utility cabinet 10 has an upper side hatch 11 and a lower side hatch 12, the utility cabinet 10 is mounted on feet 16 and is accessible through a front hatch 13. The front hatch 13 has a locking latch 17. A customer accesses a display 15 and can make payment at a payment processor 14. The wireless transceiver 19 connects to the Internet for remote monitoring and management of the utility cabinet 10. The touchscreen 18 connects to the display and allows user input and selection of different options. The touchscreen 18 preferably has a graphical user interface and can display instruction and payment collection videos.

A user may begin by pulling the step 40 out of the step pocket 42. The step 40 is mounted on a step rail 41. The step rail allows a user to pull out the step 40 from the step pocket 42 in case a dog needs to use the steps to enter through the front door 22. The front door 22 of the washing chamber 23 can be a sliding door with a sliding door handle. The pet can stand under the rainfall nozzle assembly 31 of the spray system 30 which has multiple nozzles mounted within a nozzle panel frame 36. For example, the nozzle panel frame can form multiple trays that receive nozzle panels. Each of the nozzle panels have individual discrete nozzle openings. After use, the washing station 20 can be sanitized. A user can pull the front cover 21 out of the washing station 20 by the front cover rail 25. The front cover handle 24 of the front cover 21 allows a user to pull the front cover 21 to close the washing chamber 23. The spray system 30 then sprays the enclosure to prepare the washing chamber 23 for the next pet to be washed. A controller in the utilities cabinet 10 controls the spray system 30. The spray system 30 is mounted on a nozzle rack 32 which can be formed as a rail mounted around and inside periphery of an upper portion of the washing chamber 23 as shown in FIG. 1.

Figure 2:
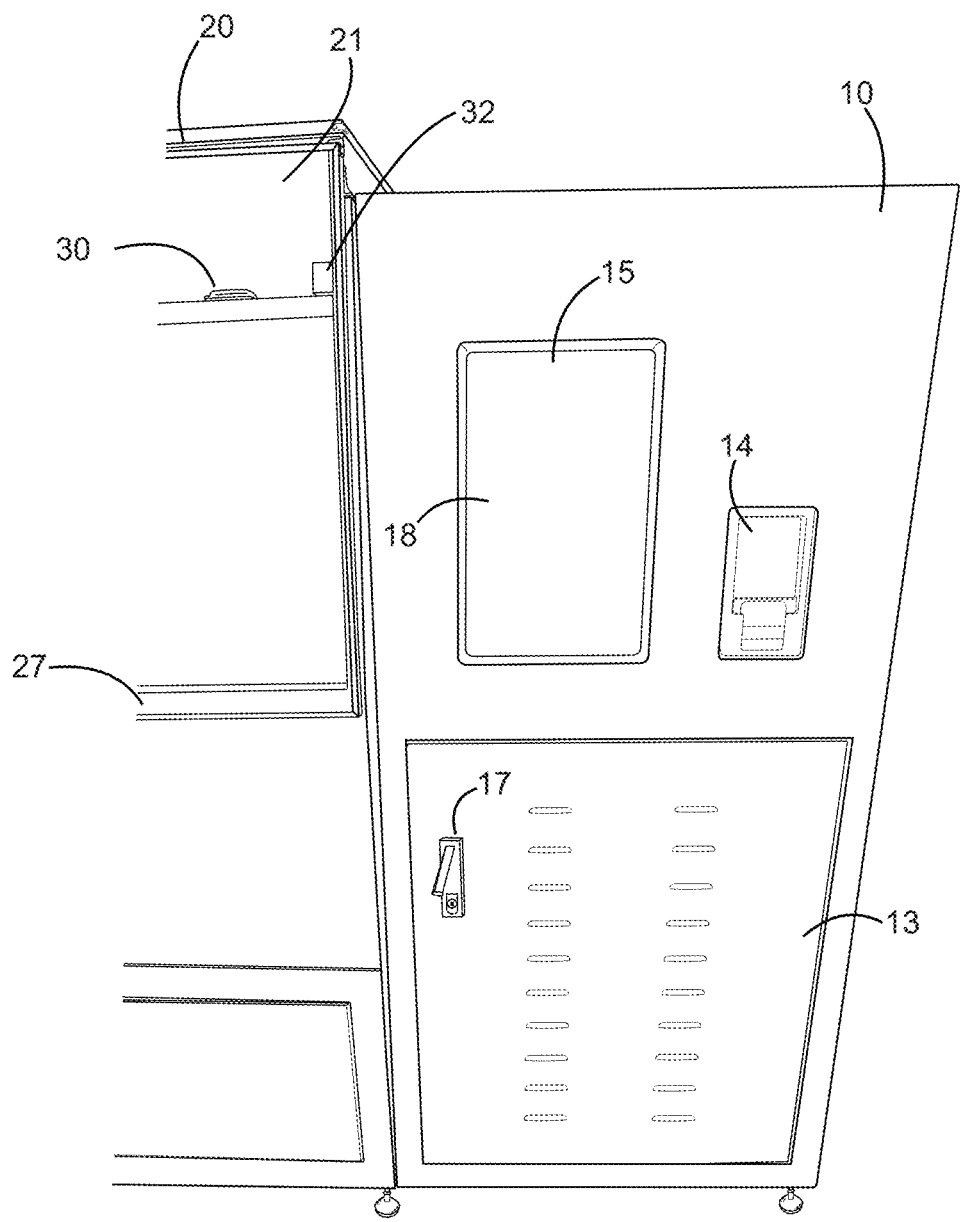
FIG. 2 is a perspective view of the utility cabinet.

As seen in FIG. 2, the utilities cabinet is connected to the washing station 20. The utilities cabinet 10 has a display 15 with a touchscreen 18. A user can receive instructions on the touchscreen 18 and pay on the touchscreen 18 with a payment processor 14. The interior portion of the pet bath machine can be accessed through the front hatch 13 at the latch 17. For example, a user can be offered different temperature of water, different concentrations of soap, different kinds of soap and different blow dry options.

The utilities cabinet brings water to the spray system 30. The water does not splash out during the cleaning cycle if the front cover 21 is closed such that a front cover overlap 27 encloses the washing station 20. The user can run the cleaning cycle, and the user can be an attendant or the customer.

Figure 3:
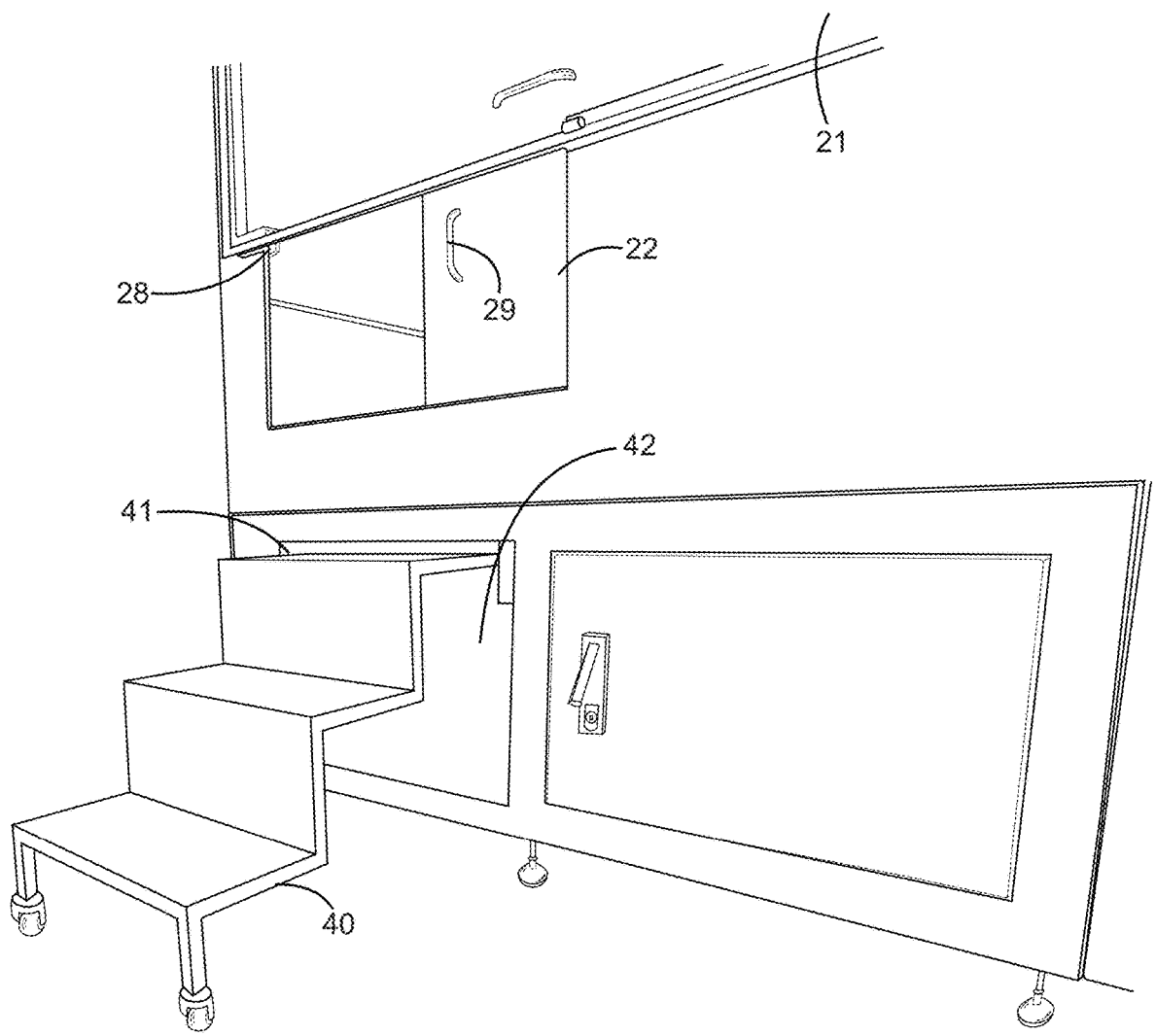
FIG. 3 is a diagram showing the step.

As seen in FIG. 3, the step 40 may have wheels to allow easy withdrawal from the step pocket 42 while mounted on the step rail 41. The front cover 21 and slightly overlaps the front door 22 but does not cover the front door handle 29. The front door handle 29 allows a user to close the front door 22 even when the front cover 21 is closed. The front cover 21 has a closed mode and a stowed mode where the front cover overlaps the front door rail 28. The front door 22 is mounted on the front door rail 28 such that the front door 22 is a sliding door.

Figure 4:
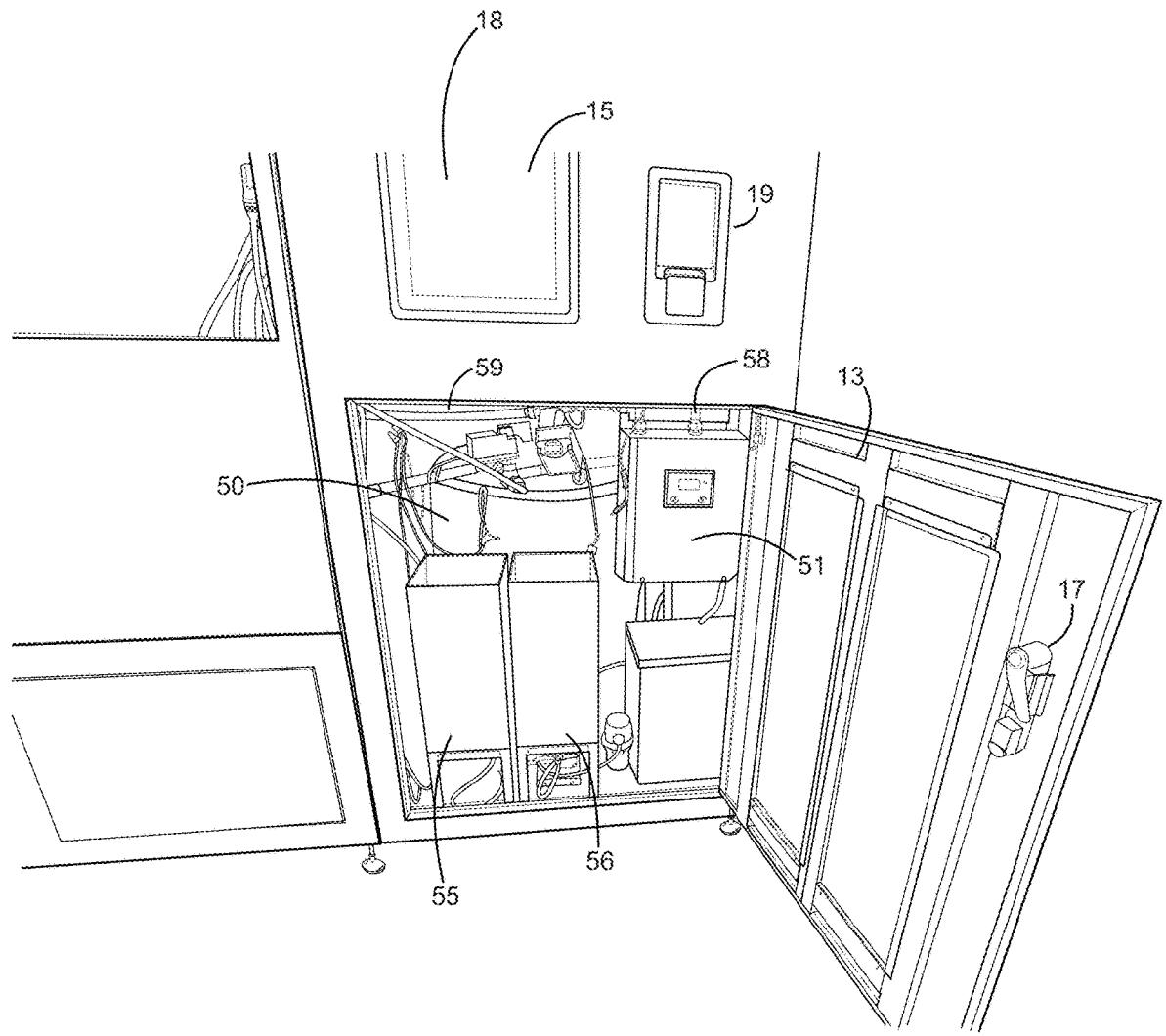
FIG. 4 is a diagram showing the interior of the utility cabinet.

As seen in FIG. 4, the transceiver 19 is adjacent to the display 15 and can interact with the touch screen 18. For example, when the user enters a payment, the transceiver 19 can send a payment to the server for remote monitoring. The central server can also monitor the shampoo bin 55 and the disinfectant bin 56. When shampoo is low or disinfectant is low, the transceiver 19 can wirelessly notify an attendant that is on-site for example. The shampoo or disinfectant level can also be displayed on the display 15. The controller 51 is connected to the transceiver 19 such that the transceiver 19 can send pump usage logs such as pump states. The hot water tank 50 is pressurized from an inlet water line. The controller 51 can further pressurize the inlet water line. A cold water line 58 and a hot water line 59 can pass to the washing chamber. The front hatch 13 has a latch 17 with a handle for locking the front hatch 13 of the utility cabinet. The air and water pass from the utility cabinet to the washing station 20.

Figure 5:
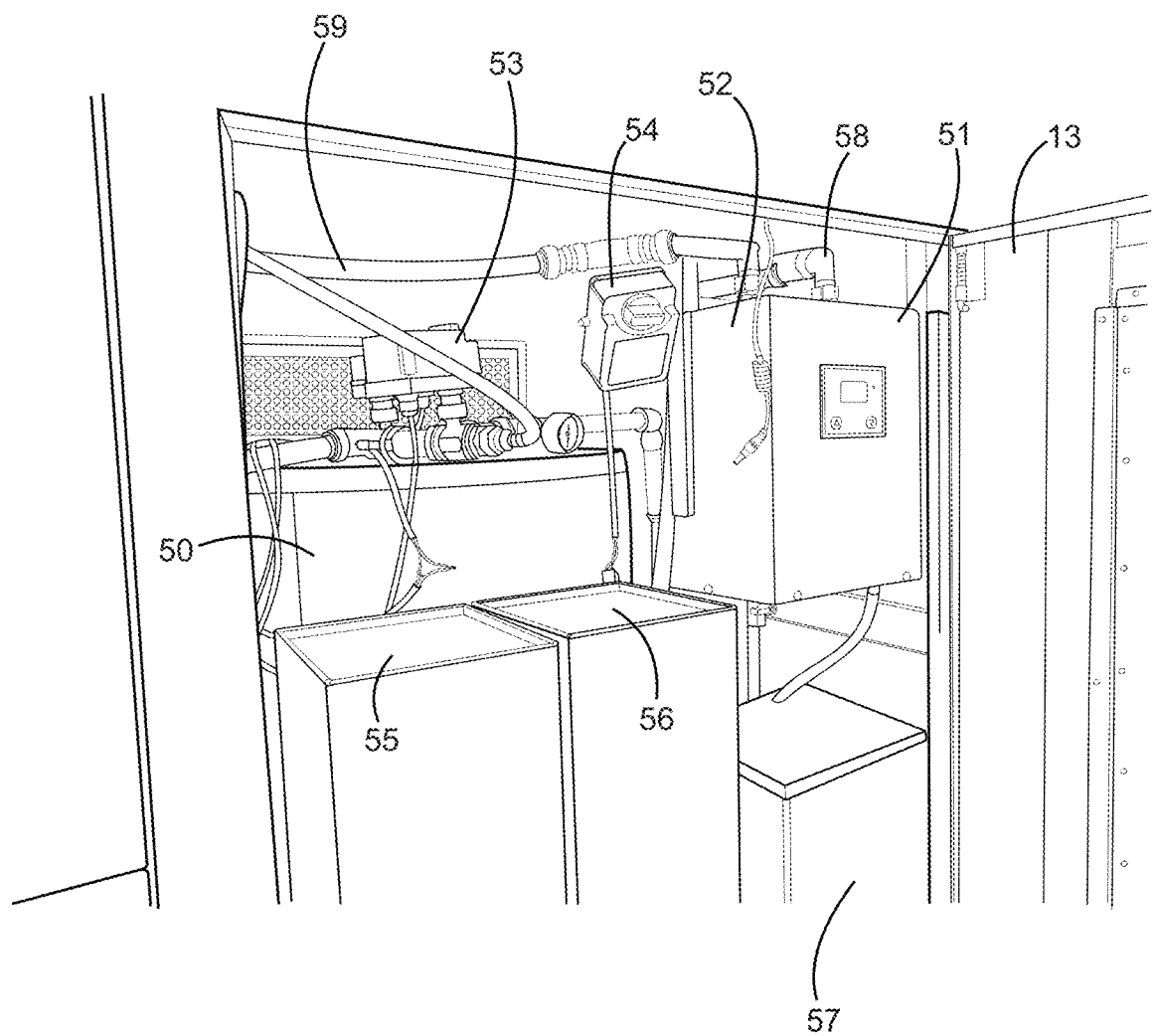
FIG. 5 is another diagram showing the interior of the utility cabinet.

As seen in FIG. 5, the hot water tank 50 supplies hot water to a hot water line 59 through the controller 51 which controls a pump for mixing the cold water line 58 with the hot water line 59. The pump system 52 is controlled by the controller. The pump system 52 controls the proportion of the hot and cold water as well as controlling the disinfectant pump 54 which controls the amount of disinfectant taken from the disinfectant bin 56 and sent to the washing chamber. The shampoo pump 53 controls the amount of shampoo taken from the shampoo bin 55 and sent to the washing chamber. The power supply 57 powers the pump system 52 and the controller 51. The shampoo pump can be mounted under the shampoo bin also, or there can be two shampoo pumps. The shampoo pump 53 can have or be mounted near an electrical valve for hand support rinse wand. The disinfectant pump 54 can have or be mounted near an electrical valve for the top spray system. The shampoo pump 53 can be mounted under the pump tank.

Figure 6:
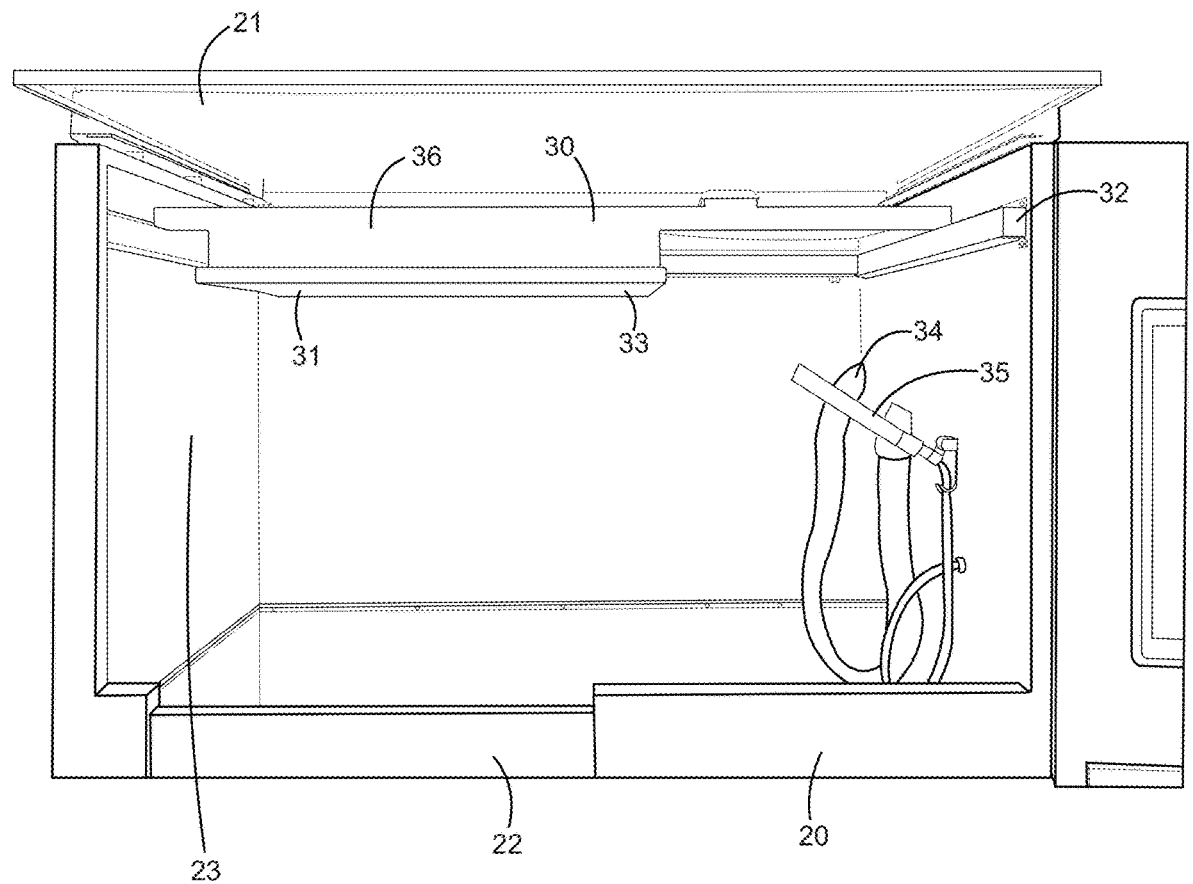
FIG. 6 is a diagram showing the washing chamber.

As seen in FIG. 6, the washing chamber 23 has a spray system 30. The spray system 30 includes nozzles mounted on nozzle panels 33. The nozzle panels 33 combined to form a rainfall nozzle assembly 31. The rainfall nozzle assembly 31 is mounted to the nozzle panel frame 36. The nozzle panel frame 36 is mounted to the nozzle rack 32. The nozzle panel frame 36 is formed as a modular section so that the spray system 30 can be interchanged with a different spray system. For example, for smaller dogs, the nozzle panel 33 can be about two thirds of the length of the washing chamber 23, and for larger dogs, the nozzle panel can be about the entire length of the washing chamber 23. The nozzle panel frame 36 can be interchanged with a different nozzle panel frame. By allowing modular connection and reconnection to the nozzle rack 32, the machine operator can adjust the machine type according to different sized dogs by interchanging the nozzle panel frame 36 with another nozzle panel frame of appropriate size. The nozzle panels 33 are preferably rubber arrays of nozzles mounted on a nozzle panel to provide a rainfall and spray pattern. The rainfall and spray pattern can be interchanged by interchanging the nozzle panel frame 36. The nozzle panel frame 36 can be interchanged tool free by sliding off the nozzle rack 32. After washing the dog or other pet, the blower 34 can blow dry the dog. The rinse wand 35 can be an optional feature that allows the user to direct water at other portions of the dog.

Figure 7:
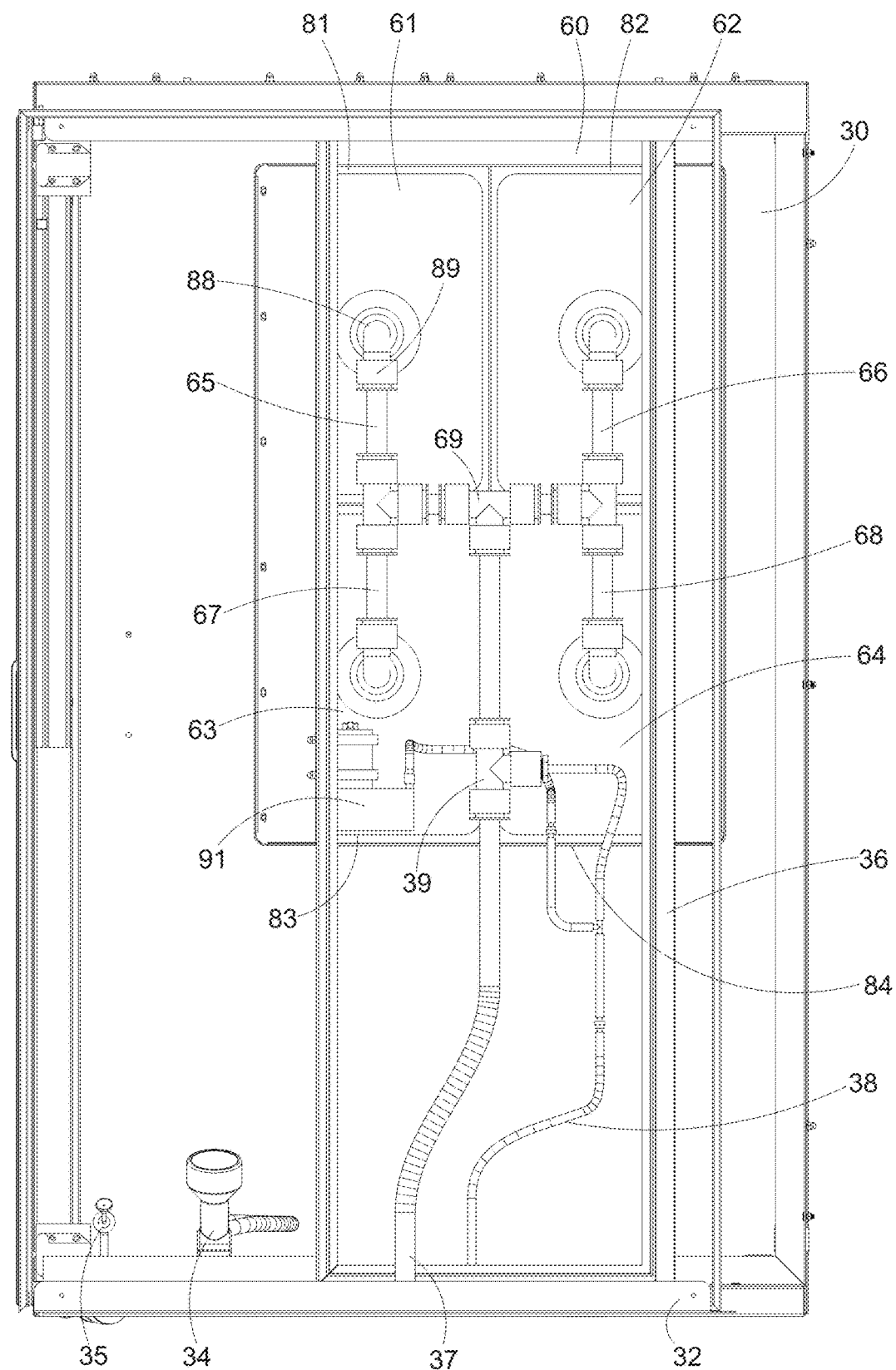
FIG. 7 is a diagram showing the nozzle array.

As seen in FIG. 7, the nozzle array 60 is mounted in the nozzle panel frame 36. The nozzle panel frame 36 includes a first nozzle tray 81, a second nozzle tray 82, a third nozzle tray 83, and a fourth nozzle tray 84. The first nozzle tray 81 holds a first nozzle panel 61. The second nozzle tray 82 holds a second nozzle panel 62. The third nozzle tray 83 holds a third nozzle panel 63. The fourth nozzle tray 84 holds a fourth nozzle panel 64. The nozzle panels are arranged in an array with columns and rows such that the nozzle panels are arranged in a nozzle array 60. The nozzle arrays 60 is a part of the spray system 30. The first nozzle panel receives a first water line 65, and the second nozzle panel receives a second water line 66. The third nozzle panel receives a third waterline 67, and the fourth waterline 68 feeds to the fourth nozzle panel 64.

The nozzle panel frame preferably has a periphery around the nozzle array 60 with dividers between the columns and rows such that the nozzle panels are bounded at all four edges of their periphery by a vertical divider wall. The water lines including the first waterline, second waterline, third waterline, and fourth waterline part connected together at a water outlet branch 69. The water outlet branch 69 is piped to a shampoo mixer 39 which may draw shampoo from a shampoo line 38 when the shampoo line 38 is controlled by a shampoo pump. The inlet waterline 37 is connected to the shampoo mixer 39. Each of the connections may include a pipe elbow 88 with a pipe quick connection 89. For example, removing the nozzle array 60 can be done by disconnecting the inlet waterline 37 from the water outlet branch 69 at the pipe quick connection 89.

The nozzle trays hold the nozzles and stabilize them. The nozzle trays can have upper covers that are enclosed such that and edge of the nozzle panels is enclosed. The nozzle panel frame 36 is preferably formed as a pair of long rails that crosses over the washing chamber. The pair of long rails of the nozzle panel frame 36 are preferably connected together at their ends for mounting to the nozzle rack 32. The rinse wand 35 and the blower 34 are mounted away from the nozzle array 60 such that they are not under the nozzle array 60. The water inlet line 37 passes to the utility cabinet. After prolonged use, the nozzle panels may need to be removed and decalcified. Each of the nozzle panels can be removed at the pipe elbows 88 for soaking in acidic solution as a part of a regular maintenance program. Also, the nozzle panels being modular with the nozzle array 60 also being modular, allows for fast maintenance.

Figure 8:
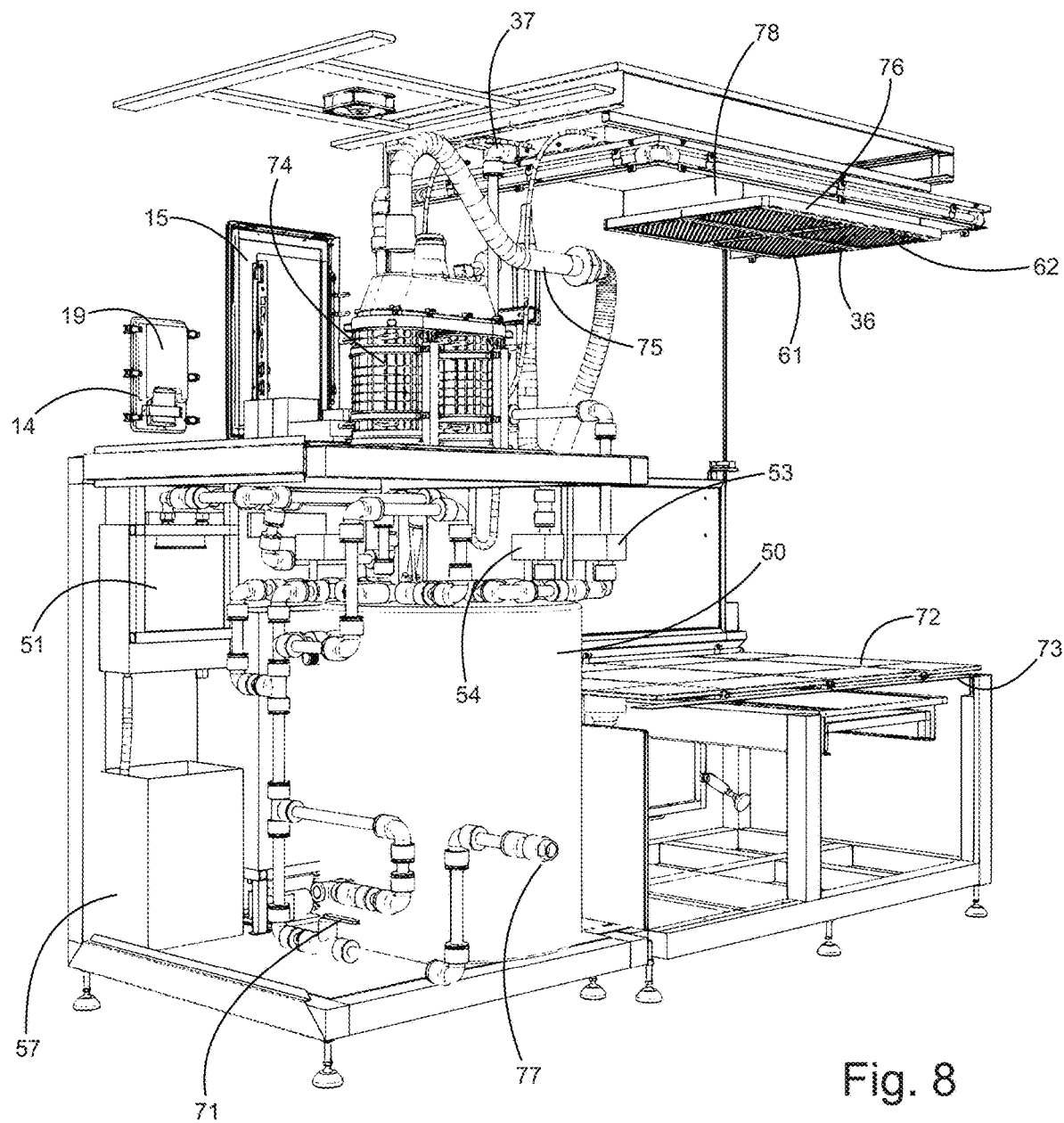
FIG. 8 is a system diagram showing thing the connection between the modules.

As seen in FIG. 8, the entire system shows a complete cycle of water from the building water connection 77 passing to the main shutoff pump 71. The hot water line enters the hot water tank 50 and the cold water tank goes to a pump such as the pump controller 51. The pump controller 51 can also be a pump controller 51 such as when insufficient building water pressure is available. The power supply 57 also connects to the building means. The pump controller 51 controls the disinfection pump 54 and the shampoo pump 53. Each of the pumps provides different functionality for different cycles of the operation. The first cycle is the disinfecting cycle, the second cycle is the rinse cycle, the third cycle is the pet rinse cycle, and the fourth cycle is the pet shampoo cycle. A fifth cycle such as a pet rinse cycle can also be added with a sixth cycle being a blower cycle. Optionally, a seventh cycle can be a disinfecting cycle.

The transceiver 19 connects to a payment processor 14 which processes a payment such as a credit card or cell phone style payment. The transceiver is also electrically connected to the display 15 which shows the user the status of the cycle. The display 15 can also give instructions for the user such as how long the user has left for blow drying the dog.

The blower line 75 extends from the blower motor 74 and the blower line extends into the washing chamber terminating at a blower wand for blow drying a pet. The panel frame upper 78 is formed as a sidewall that passes around the panel frame upper portion. The panel frame periphery 76 is also formed as a sidewall that retains the first nozzle panel 61 and the second nozzle panel 62. The panel frame periphery 76 is formed as a part of the nozzle panel frame 36. The same panel frame periphery 76 can be a used as the same structure for retaining the nozzle panels. The subfloor 72 receives water that passes around the subfloor panels. The water that is drained goes to a drain pan 73 which then drains from the system.

Figure 9:
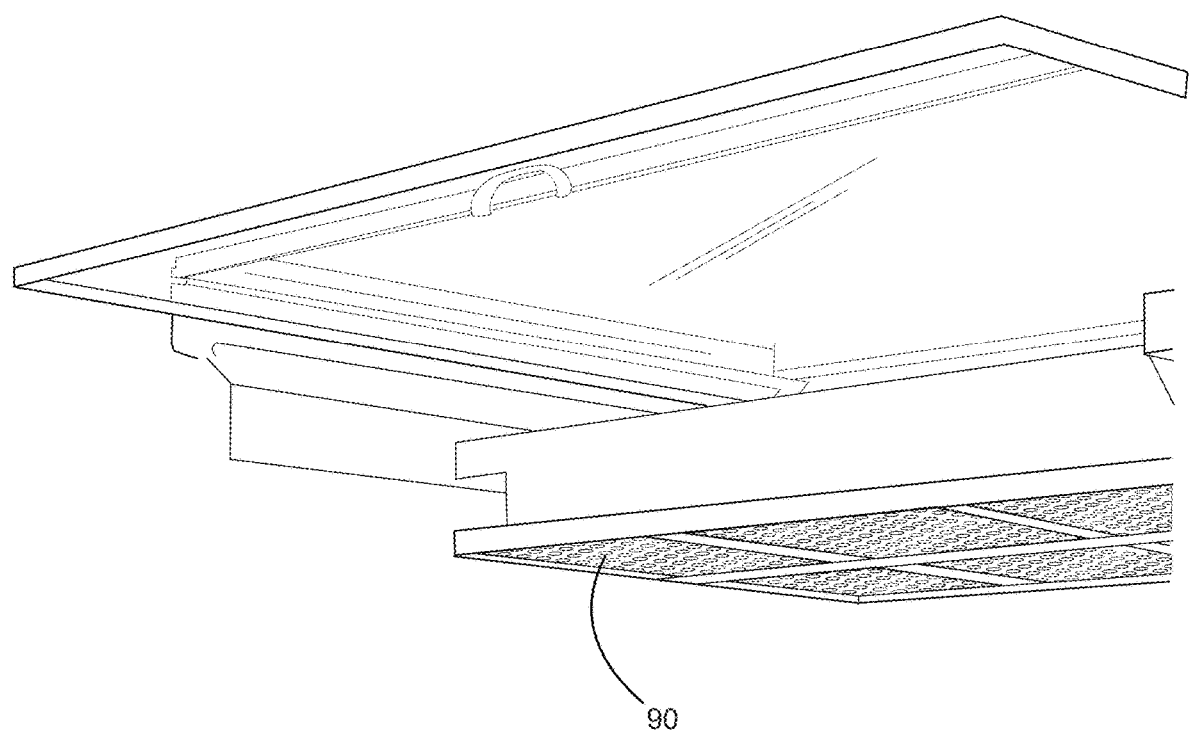
FIG. 9 is a system diagram showing individual nozzles.

As seen in FIG. 9, the individual nozzle 90 is preferably a rounded elastomeric member with a water outlet opening. The individual nozzles form an array of individual nozzles which are preferably elastomeric. The array of individual nozzles is mounted to the nozzle panel. The nozzle panel has multiple openings for receiving the individual nozzles 90. The nozzle panels are then mounted in a nozzle panel array. In this way, over 100 individual nozzles can be directed at the pet for improved washing capability.

The air pump 91 purges out water from the array of nozzles after a user washes their pet. The air pump is connected to the water line of the top sprayer and blows airflow into water line to purge water after water spraying. Automatically activating top panel sprayer switch off blows out remaining water in the top sprayer panels and ensures that there is no dripping on the pet while blowdrying. The air pump 91 is connected to the water inlet line 37 or the top part of the shampoo line that would be empty after use. The air pump 91 can be controlled with the shampoo pump so that the air pump turns on after the shampoo is off to clear the shampoo in the upper portion of the shampoo line and then clear the water out of the water line and nozzles.

The invention claimed is:

1. A pet bath machine comprising:
   a. a utility cabinet, wherein the utility cabinet has a hot water line and a cold water line, wherein the hot water line and the cold water line connect together at a water inlet line;
   b. a pump system, wherein the pump system includes a pump controller, wherein the pump controller controls a flow of water, wherein the flow of water includes a flow of hot water and a flow of cold water;
   c. a shampoo pump, wherein the shampoo pump controls a flow of shampoo to the flow of water;
   d. a washing station, wherein the washing station has a washing chamber; and
   e. a spray system, wherein the spray system is mounted over the washing chamber, wherein the spray system includes nozzle panels mounted in a nozzle panel frame, wherein the nozzle panels have multiple individual nozzle heads, wherein the spray system is connected to the water inlet line.

2. The pet bath machine of claim 1, further including a display, wherein the display is connected to a payment processor.

3. The pet bath machine of claim 1, wherein the shampoo pump has a shampoo valve, wherein the shampoo valve admits shampoo when activated, further including a panel or curtain for enclosing the washing chamber to prevent water from splashing out when the spray system is in operation.

4. The pet bath machine of claim 3, further including: a water outlet branch, wherein the water outlet branch connects to the nozzle panels, wherein the nozzle panels include a first nozzle panel, a second nozzle panel, a third nozzle panel, and a fourth nozzle panel.

5. The pet bath machine of claim 4, wherein the water inlet line branches at the water outlet branch to water lines wherein the first nozzle panel is connected to a first water line, a second nozzle panel is connected to a second water line, a third nozzle panel is connected to a third water line, and a fourth nozzle panel is connected to a fourth water line.

6. The pet bath machine of claim 1, further including: a plurality of nozzle trays formed on the nozzle panel frame, wherein the plurality of nozzle trays receives the nozzle panels.

7. The pet bath machine of claim 1, further including a wireless transceiver connected to the payment processor, wherein the payment processor electronically processes payments.

8. The pet bath machine of claim 1, further including a blower wand for blow drying and a rinse wand for rinsing, wherein both the blower wand and rinse wand are mounted in the washing chamber.

9. The pet bath machine of claim 1, further including a shampoo container and a disinfectant container, wherein the pump controller controls a shampoo pump, wherein the shampoo pump is a shampoo pump, and a disinfectant pump, wherein the disinfectant pump is a disinfectant pump, wherein the shampoo pump admits shampoo from the shampoo container to the inlet water line, wherein the disinfectant pump admits disinfectant from the disinfectant container to the inlet water line via a disinfectant line.

10. The pet bath machine of claim 9, further including: a plurality of nozzle trays formed on the nozzle panel frame, wherein the plurality of nozzle trays receives the nozzle panels.

11. The pet bath machine of claim 10, further including: a water outlet branch, wherein the water outlet branch connects to the nozzle panels, wherein the nozzle panels include a first nozzle panel, a second nozzle panel, a third nozzle panel, and a fourth nozzle panel.

12. The pet bath machine of claim 10, wherein the water inlet line branches at the water outlet branch to water lines wherein the first nozzle panel is connected to a first water line, a second nozzle panel is connected to a second water line, a third nozzle panel is connected to a third water line, and a fourth nozzle panel is connected to a fourth water line.

13. The pet bath machine of claim 12, further including a wireless transceiver connected to the payment processor, wherein the payment processor electronically processes payments.

14. The pet bath machine of claim 13, further including a blower wand for blow drying and a rinse wand for rinsing, wherein both the blower wand and rinse wand are mounted in the washing chamber.

15. The pet bath machine of claim 1, further including:
   a. a shampoo container and a disinfectant container, wherein the pump controller controls a shampoo pump and a disinfectant pump, wherein the shampoo pump admits shampoo from the shampoo container to the inlet water line via a shampoo line, wherein the disinfectant pump admits disinfectant from the disinfectant container to the inlet water line;
   b. a plurality of nozzle trays formed on the nozzle panel frame, wherein the plurality of nozzle trays receives the nozzle panels;
   c. a water outlet branch, wherein the water outlet branch connects to the nozzle panels, wherein the nozzle panels include a first nozzle panel, a second nozzle panel, a third nozzle panel, and a fourth nozzle panel; and wherein the water inlet line branches at the water outlet branch to water lines wherein the first nozzle panel is connected to a first water line, a second nozzle panel is connected to a second water line, a third nozzle panel is connected to a third water line, and a fourth nozzle panel is connected to a fourth water line; and
   d. a nozzle rack, wherein the nozzle rack receives the nozzle panel frame and allows modular interchangeability of the nozzle panel frame, wherein the nozzle rack is mounted above the washing chamber.

16. The pet bath machine of claim 15, further including a wireless transceiver connected to the payment processor, wherein the payment processor electronically processes payments.

17. The pet bath machine of claim 15, further including a blower for blow drying and a rinse wand for rinsing, wherein both the blower and rinse wand are mounted in the washing chamber.

18. The pet bath machine of claim 15, further including an air pump connected to the water inlet line or to the shampoo line.

* * * * *